(12) United States Patent
Boucadair et al.

(10) Patent No.: US 10,868,796 B2
(45) Date of Patent: Dec. 15, 2020

(54) METHOD OF COMMUNICATION BY MULTIPLE PATHS BETWEEN TWO TERMINALS

(71) Applicant: Orange, Paris (FR)

(72) Inventors: Mohamed Boucadair, Betton (FR); Christian Jacquenet, Pont-pean (FR)

(73) Assignee: ORANGE, Paris (FR)

( * ) Notice: Subject to any disclaimer, the term of this patent is extended or adjusted under 35 U.S.C. 154(b) by 37 days.

(21) Appl. No.: 15/300,657

(22) PCT Filed: Mar. 20, 2015

(86) PCT No.: PCT/FR2015/050708
§ 371 (c)(1),
(2) Date: Sep. 29, 2016

(87) PCT Pub. No.: WO2015/150659
PCT Pub. Date: Oct. 8, 2015

(65) Prior Publication Data
US 2017/0118169 A1   Apr. 27, 2017

(30) Foreign Application Priority Data
Mar. 31, 2014 (FR) ..................... 14 52844

(51) Int. Cl.
*H04L 29/12* (2006.01)
*H04L 29/06* (2006.01)
(Continued)

(52) U.S. Cl.
CPC .......... *H04L 61/2503* (2013.01); *H04L 45/02* (2013.01); *H04L 45/24* (2013.01);
(Continued)

(58) Field of Classification Search
CPC ..... H04L 61/2503; H04L 45/02; H04L 45/24; H04L 45/74; H04L 69/169
See application file for complete search history.

(56) References Cited

U.S. PATENT DOCUMENTS 6,219,706 B1 * 4/2001 Fan ...................... H04L 63/0254
709/225
9,948,725 B2 * 4/2018 Biswas ................. H04L 67/141
(Continued)

OTHER PUBLICATIONS

Ford et al.; "TCP Extensions for Multipath Operation with Multiple Addresses"; p. 7, 18-19, 35-39 (Year: 2013).*
(Continued)

*Primary Examiner* — Un C Cho
*Assistant Examiner* — Yu-Wen Chang
(74) *Attorney, Agent, or Firm* — David D. Brush; Westman, Champlin & Koehler, P.A.

(57) ABSTRACT

A transmission control protocol communications method between a first device and a second device. The method includes the following acts: a) the first device, or a proxy connected to the first device, collects information about existence of network address translators and/or firewalls, if any, placed in series on at least one possible communications path between the first device and the second device and known to the first device or to the proxy connected to the first device; b) the first device or the proxy creates an entry in at least one such network address translator and/or firewall, the entry including at least one IP address and/or at least one port number of the first device; and c) the first device or the proxy transmits to the second device the at least one IP address and/or the at least one port number in a TCP option.

16 Claims, 7 Drawing Sheets

(51) Int. Cl.
*H04L 12/751* (2013.01)
*H04L 12/707* (2013.01)
*H04L 12/741* (2013.01)

(52) U.S. Cl.
CPC .............. *H04L 45/74* (2013.01); *H04L 69/14* (2013.01); *H04L 69/161* (2013.01); *H04L 69/169* (2013.01); *H04L 69/22* (2013.01); *Y02D 30/50* (2020.08)

(56) References Cited

U.S. PATENT DOCUMENTS

| | | | | |
|---|---|---|---|---|
| 2003/0233576 | A1* | 12/2003 | Maufer | H04L 29/06 709/226 |
| 2004/0088537 | A1* | 5/2004 | Swander | H04L 63/0464 713/153 |
| 2007/0157303 | A1* | 7/2007 | Pankratov | H04L 29/12528 726/11 |
| 2009/0175282 | A1* | 7/2009 | Babin | H04W 40/02 370/401 |
| 2012/0144062 | A1* | 6/2012 | Livet | H04L 45/24 709/239 |
| 2012/0226802 | A1* | 9/2012 | Wu | H04L 1/1825 709/224 |
| 2015/0281367 | A1* | 10/2015 | Nygren | H04L 47/193 709/228 |
| 2015/0319270 | A1* | 11/2015 | Roeland | H04L 61/2007 370/254 |

OTHER PUBLICATIONS

Information Sciences Institute University of Southern California; "Transmission Control Protocol DARPA Internet Program Protocol Specification"; p. 81 (Year: 1981).*
Ford et al., "TCP Extensions for Multipath Operation with Multiple Addresses; rfc6824.txt", TCP Extensions for Multipath Operation With Multiple Addresses; RFC6824.TXT, Internet Engineering Task Force. IETF; Standard, Internet Society (ISOC) 4, Rue Des Falaises CG—1205 Geneva, Switzerland, Jan. 17, 2013 (Jan. 17, 2013), pp. 1-64, XP015086539.
Information Sciences Institute University of Southern California, "Transmission Control Protocol DARPA Internet Program Protocol Specification", Sep. 1981, RFC 793.
Schart et al., "Multipath TCP (MPTCP) Application Interface Considerations" Internet Engineering Task Force (IETF), RCE 6897, Mar. 2013.
English translation of the Written Opinion of the International Searching Authority dated Jun. 3, 2015 for corresponding International Application No. PCT/FR2015/50708, filed Mar. 20, 2015.
International Search Report dated Jun. 3, 2015 for corresponding International Application No. PCT/FR2015/50708, filed Mar. 20, 2015.
Wing R Ravindranath et al., "Multipath TCP (MPTCP) Path Selection using PCP"; draft-wing-mptcp-pcp-OO.txt Multi Path TCP (MPTCP) Path Selection Using PCP; Draft-Wing-Mptcp-Pcp-Oo. Txt, Internet Engineering Task Force, IETF; Standard Working Draft, Internet Society (ISOC) 4, Rue Des Falaises CH—1205 Geneva, Switzerland, Oct. 7, 2013 (Oct. 7, 2013), pp. 1-10, XP015095076.
Williams Akamai B et al., "Experimental Option for TCP Host Identification"; draft-williams-exp-tcp-host-id-opt-02.txt Experimental Option for TCP Host Identification; Draft-Williams-Exp-Tcp-Host-Id-Opt-02,Txt, Internet Engineering Task Force, IETF; Standard Working Draft, Internet Society (ISOC) 4, Rue Des Falaises Ch—1205 Geneva, Switzerland, Feb. 12, 2014 (Feb. 2, 2014), pp. 1-9, KP015096678.
Wing D et al., "Port Control Protocol (PCP)"; rfc6887.txt Port Control Protocol (PCP); RFC6887.Txt, Internet Engineering Task Force. IETF; Standard, Internet Society (ISOC) 4, Rue Des Falaises CH—1205 Geneva, Switzerland, Apr. 30, 2013 (Apr. 30. 2013), pp. 1-88, XP015090359.
Written Opinion of the International Searching Authority dated Jun. 3, 2015 for corresponding International Application No. PCT/FR2015/50708, filed Mar. 20, 2015.

* cited by examiner

```
                     1                   2                   3
 0 1 2 3 4 5 6 7 8 9 0 1 2 3 4 5 6 7 8 9 0 1 2 3 4 5 6 7 8 9 0 1
+---------------+---------------+-------+-+-------+---------------+
|     Kind      |    Length     |ADD_ADDR|IPv4/v6|   Address ID  |
+---------------+---------------+-------+-+-------+---------------+
|              Address (IPv4 - 4 octets / IPv6 - 16 octets)      |
+---------------------------------------------------------------+
|  Port (2 octets, optional)    |
+-------------------------------+
```

FIG. 6

```
                     1                   2                   3
 0 1 2 3 4 5 6 7 8 9 0 1 2 3 4 5 6 7 8 9 0 1 2 3 4 5 6 7 8 9 0 1
+---------------+---------------+-------+-------+---------------+
|     Kind      |    Length     | TRUST |0000000| Address ID (opt)|
+---------------+---------------+-------+-------+---------------+
```

FIG. 7

```
                     1                   2                   3
 0 1 2 3 4 5 6 7 8 9 0 1 2 3 4 5 6 7 8 9 0 1 2 3 4 5 6 7 8 9 0 1
+---------------+---------------+-------+-------+---------------+
|     Kind      |    Length     |Tru_ADD|IPv4/v6|   Address ID  |
+---------------+---------------+-------+-------+---------------+
|              Address (IPv4 - 4 octets / IPv6 - 16 octets)      |
+---------------------------------------------------------------+
|   Port (2 octets)             |  Lifetime (4 octets)          |
+-------------------------------+-------------------------------+
|  Lifetime (continued)         |
+-------------------------------+
```

FIG. 8

```
                     1                   2                   3
 0 1 2 3 4 5 6 7 8 9 0 1 2 3 4 5 6 7 8 9 0 1 2 3 4 5 6 7 8 9 0 1
+---------------+---------------+-------+-----------------------+
|     Kind      |    Length     |LIFETIME| Lifetime (4 octets)  |
+---------------+---------------+-------+-----------------------+
| Lifetime (continued)          |  Reserved     |  Address ID   |
+-------------------------------+---------------+---------------+
```

FIG. 9

```
                     1                   2                   3
 0 1 2 3 4 5 6 7 8 9 0 1 2 3 4 5 6 7 8 9 0 1 2 3 4 5 6 7 8 9 0 1
+---------------+---------------+-------+-------+---------------+
|     Kind      |    Length     | RATIO |Sug_Val|  Address ID   |
+---------------+---------------+-------+-------+---------------+
```

METHOD OF COMMUNICATION BY MULTIPLE PATHS BETWEEN TWO TERMINALS

CROSS-REFERENCE TO RELATED APPLICATIONS

This application is a Section 371 National Stage Application of International Application No. PCT/FR2015/050708, filed Mar. 20, 2015, the content of which is incorporated herein by reference in its entirety, and published as WO 2015/150659 on Oct. 8, 2015, not in English.

FIELD OF THE DISCLOSURE

The present invention relates to the field of telecommunications, and specifically to communications networks that make use of the Internet protocol (IP). More particularly, the present invention relates to providing services in added-value IP networks, i.e. networks that are capable of treating traffic in differentiated manner depending on the nature of the data traffic being conveyed in the network.

The invention applies to any type of client device such as a fixed or mobile terminal, a residential gateway, or a gateway situated in a business, or indeed a gateway of a network operator. For reasons of concision, a client device of any type is often referred to below as a "terminal".

BACKGROUND OF THE DISCLOSURE

Terminals, such as smartphones or personal computers (PCs) are nowadays capable of making use of a plurality of logical interfaces connected to one or more physical interfaces. Such terminals are said to be multi-interface (MIF) terminals.

A plurality of IP addresses can then be allocated to such a MIF terminal in order to connect to various types of network such as a fixed network, a mobile network, or a wireless local area network (WLAN), where WiFi networks are particularly well known. These IP addresses may:
- belong to a single family of addresses, or to distinct families of addresses (IPv4, IPv6, or both);
- have different lifetimes;
- have different coverage ranges, e.g. a private IPv4 address, a unique local IPv6 address (ULA), or a global unique IPv6 address (GUA); and
- may be allocated to a single logical network interface or to different logical network interfaces.

Nevertheless, it should be observed that the "MIF" characteristic is volatile, since the ability to use a plurality of interfaces depends on network connection conditions, on the location of the device, and so on. A device may become a MIF device while setting up a simple connection (i.e. along a single path to a correspondent), or indeed after a simple connection has been set up. Furthermore, a device does not know a priori whether it is possible to use a plurality of distinct paths in order to set up communication with a correspondent; specifically, this information (where applicable) becomes available thereto only at the end of a stage during which the device attempts to set up a multiple path connection with its correspondent.

It should be recalled that transmission control protocol (TCP), as defined in particular in the Internet Engineering Task Force (IETF) specification RFC 793, is one of the main protocols used by terminals connected to an IP network (e.g. the Internet), such that the literature often makes mention of the "TCP/IP" suite of protocols. The TCP protocol serves to convey a stream of digital data in a manner that is reliable, ordered, and error-free between applications that are being executed on terminals that are themselves connected to a local network (e.g. an Intranet) or to the Internet. It operates at the transport layer level of the open systems interconnection (OSI) model. Web browsers use TCP when they connect to remote servers; the TCP protocol is also used for conveying email and for transferring files from one location to another. Protocols such as HTTP, HTTPS, SMTP, POP3, IMAP, SSH, FTP, Telnet, and numerous other protocols are transported over TCP connections. A TCP flow is identified by the address and the port number of the source terminal, and by the address and the port number of the destination terminal.

Two terminals can insert so-called "TCP options" in the TCP messages that they exchange, e.g. for the purpose of optimizing the quality of TCP transmission. Such options occupy space that is available at the end of the TCP header, and they are of a length that is expressed as a number of 8-bit bytes. The kind of option is a unique identifier describing the nature of the TCP option. For example, the value "0" marks the end of the list of options, and the value "2" indicates the maximum segment size (MSS) of the TCP segment.

The arrival of MIF terminals leads to additional complexity in using all or some of the IP addresses allocated via the available networks. In particular, given that TCP connections are associated with an IP address and a port number, any modification to this information is likely to penalize the operation of an ongoing TCP connection, and as a result to penalize the service making use of said TCP connection. Such a change is particularly harmful when the terminal is given a new IP address, or when the terminal connects to another network, or indeed when the interface with which the IP address is associated is no longer available. By way of example, in order to ensure that an existing connection is maintained, means are then required for informing a remote TCP correspondent that an IP address is no longer valid, for example.

In 2009, the IETF commissioned the mptcp work group in order to specify extensions to the TCP protocol capable of accompanying constraints imposed by the possibility of allocating a plurality of IP addresses to the various logical or physical interfaces of a terminal. That work group has published initial specifications for a protocol known as multipath TCP (MPTCP) (cf. A. Ford, C. Raiciu, and M. Handley, "TCP extensions for multipath operation with multiple addresses", RFC 6824, January 2013), and some smartphones and operating systems are already capable of implementing that protocol. The IETF expects to raise the status of present-day MPTCP "specifications" so that they become genuine "standards" in the meaning of the IETF.

The MPTCP protocol has thus been proposed to minimize any risk of untimely interruption of a TCP connection associated with such address modifications, and more generally in order to satisfy the requirements raised by a context in which a terminal has the ability to connect with one or more networks via a plurality of interfaces. The MPTCP protocol serves in particular to satisfy the need for providing flow continuity in the event of a terminal being mobile. Various usage circumstances can be envisaged for the MPTCP protocol, such as:
- transferring traffic between a plurality of WLAN access points;
- off-loading a mobile network and transferring traffic to a WLAN access point;
- aggregating a plurality of access links;
- sharing load between a plurality of paths; and
- optimizing the use of network resources.

In this respect it should be recalled (cf. Wikipedia) that in the field of networks, "aggregating links" is a concept describing grouping together a plurality of network interfaces as though there was a single interface, in order to increase throughput beyond the limits of a single link, and possibly in order to ensure that other interfaces take over if a link fails (redundancy principle).

A particularly advantageous example application of the MPTCP protocol is transferring voluminous files using the resources of the file transfer protocol (FTP). A device acting as an FTP client can make use dynamically of all of the available paths that enable it to access an FTP server, providing the server is suitable for making use of the various MPTCP connections set up by the FTP client. The time required to transfer data is thus significantly shortened compared with a TCP connection.

Figure 1:
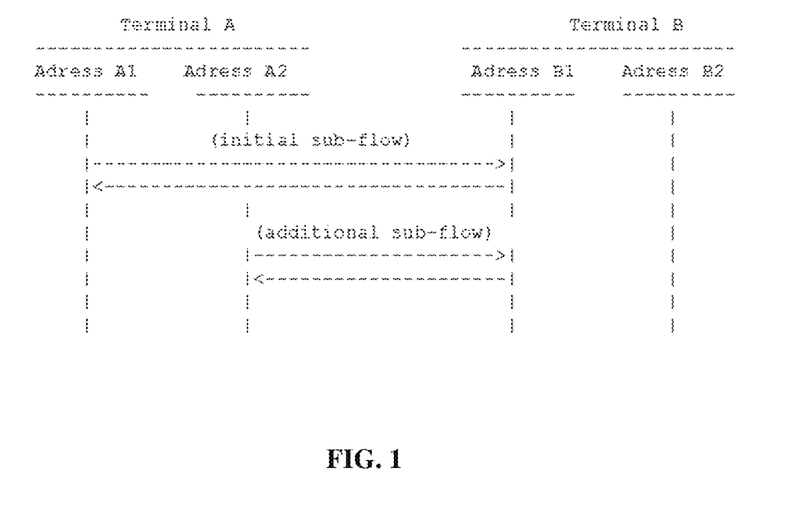
FIG. 1, described above, shows an aggregation of TCP sub-flows forming a single MPTCP connection.

In the context of MPTCP, the term "sub-flow" is used to designate a TCP flow relying on the use of one of the available IP address and port number pairs. As a result, an MPTCP connection is an aggregation of TCP sub-flows. By way of example, FIG. 1 shows an MPTCP connection between a terminal A and a terminal B; the initial sub-flow is set up between the address A1 of the terminal A and the address B1 of the terminal B; subsequently, an additional sub-flow is set up between the address A2 of the terminal A and the address B1 of the terminal B.

For the purpose of interacting with the TCP/IP layer, operating systems present dedicated interfaces to applications, which interfaces are known as application programming interfaces (APIs). The conventional API for TCP/IP is the "socket" interface. A "socket" is characterized by a plurality of attributes such as "local socket address", "remote socket address", and "protocol". New extensions (MPTCP API) have been specified by the IETF in Document RFC 6897 in order to enable applications to control MPTCP flows. It should be observed that the MPTCP API is an extension of the TCP API.

All TCP sub-flows associated with a single MPTCP connection can be grouped together in a software structure known as a "TCP connection table". In addition to the above-mentioned conventional TCP/IP attributes, attributes can be recorded therein that are specific for MPTCP. The values of those attributes in the connection table are controlled by the MPTCP API.

An MPTCP connection is initialized like any other conventional TCP connection, except that the option MP_CAPABLE (indicating that the sender terminal is compatible with MPTCP extensions) is included in the message containing the connection initialization flag (SYN) and in subsequent messages. An MPTCP terminal can inform the remote terminal of the availability of an additional IP address using the ADD_ADDR option, without necessarily creating the associated sub-flow.

Nevertheless, signaling a plurality of IP addresses that are available and suitable for use when communicating with a correspondent can lead to a failure of TCP sub-flows because the external IP addresses as perceived by the remote terminals need not be the same as those that are visible locally. For this reason, the ADD_ADDR option of the MPTCP protocol may include an address identifier (address ID) that is used to identify an available IP address without ambiguity. In the prior art, this provision is intended to avoid problems resulting from the presence of a network address translator (NAT) on the path followed by packets between the two terminals that have set up an MPTCP connection. The ADD_ADDR option is also used for transmitting a port number when one of the MPTCP terminals does not use the same port number for all of the available IP addresses.

Likewise, the MPTCP protocol has provisions that are intended specifically to make it possible to pass through firewalls. More precisely, the MPTCP protocol specifies that the sequence numbers as given in the TCP header are specific to each flow, while the sequence number given in the data sequence signal (DSS) option of the MPTCP protocol serves to associate the sub-flows with the same MPTCP connection.

The MPTCP protocol thus sets out to counter the massive proliferation of intermediate devices in a communications chain known as "middle boxes", such as NATs and firewalls in present-day networks. However, the authors of the present invention have found that, under certain configurations, as explained below on the basis of three examples, those precautions do not suffice for preventing an MPTCP connection failing to be set up.

Figure 2:
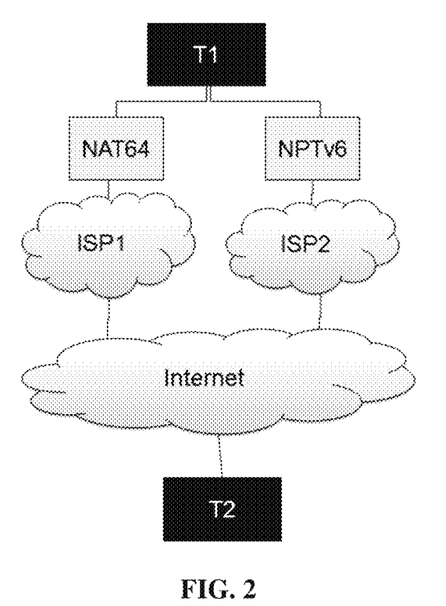
FIG. 2, described above, shows a terminal T1 connected to two distinct networks, one of the connections passing through a NAT64 function and the other through an NPTv6 function.

FIG. 2 shows an MPTCP compatible terminal T1 connected to the Internet via two networks ISP1 and ISP2 that belong to distinct access providers. For the purposes of this example, it is assumed that one or more IPv6 prefixes have been allocated to T1. Nevertheless, T1 cannot be reached from a machine connected to the Internet using those prefixes. Specifically, IP packets sent to IPv4 correspondents are intercepted by the NAT64 function (for network address and protocol translation from IPv6 clients to IPv4 servers), while native IPv6 packets are intercepted by the network prefix translation IPv6 (NPTv6) function.

Consider what happens when the terminal T1 initializes an MPTCP connection to a terminal T2 that is also MPTCP compatible.

Figure 3:
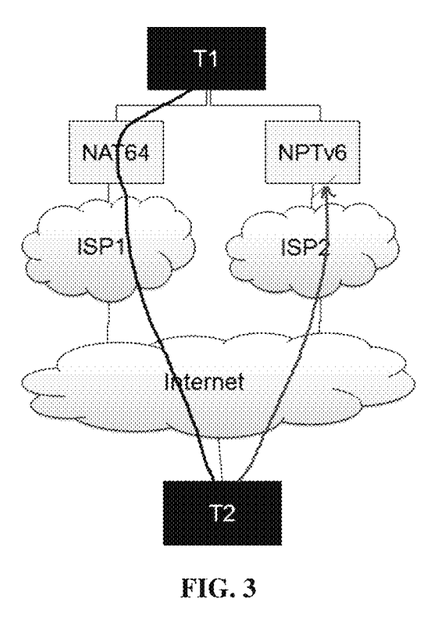
FIG. 3, described above, shows the failure of an attempt at setting up an MPTCP sub-flow to the terminal T1 from a terminal T2.

It is assumed that the packets sent by T1 are intercepted by the NAT64 function, and that T1 informs T2 about one of its IPv6 prefixes. T2 can add sub-flows with T1 by using the IPv4 address of T1 as allocated by the NAT64 function, but T2 cannot add a sub-flow to one of the IPv6 prefixes of T1 since native IPv6 packets are intercepted by the NPTv6 function, as shown in FIG. 3. The NPTv6 function rejects these packets since it does not have an entry in its translation table for processing them.

Figure 4:
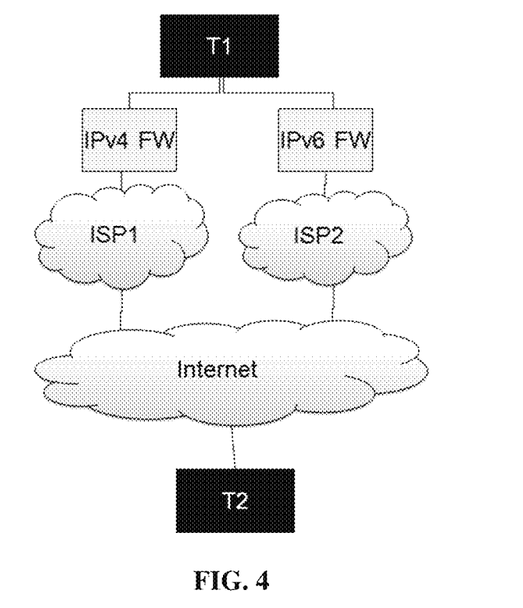
FIG. 4, described above, shows a terminal T1 connected to the Internet via two distinct networks, one of the connections passing via an IPv4 firewall and the other passing through an IPv6 firewall.
Figure 5:
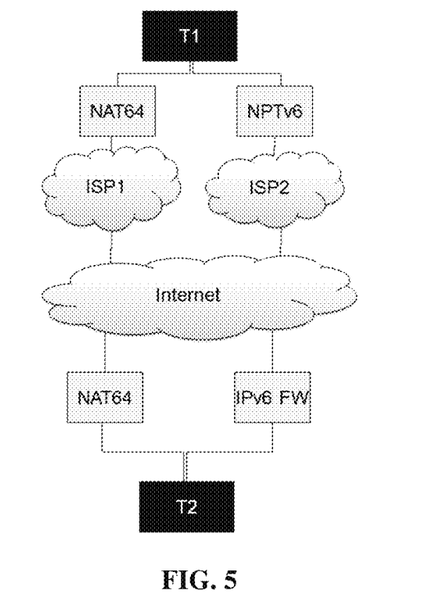
FIG. 5, described above, shows a configuration in which both the terminal T1 and the terminal T2 are connected to the Internet via a plurality of connection points.

FIG. 4 shows a second example in which the terminal T1 is connected to two access networks both via an IPv4 firewall and also via an IPv6 firewall. FIG. 5 shows a third example in which both T1 and T2 are connected to the Internet via a plurality of connection points. In these two examples, as in the first example, T2 cannot set up a TCP flow to an IPv6 prefix of T1.

SUMMARY

In a first aspect, the present invention thus relates to various transmission control protocol (TCP) communications methods between a first device and a second device.

Thus, the invention firstly provides a TCP communications method comprising the following steps:
said second device receives from said first device or from a proxy connected to the first device:
a TCP option mentioning an IP address and/or a port number; or
a TCP option referring to an IP address and/or a port number previously communicated to the second device; and
the second device updates a TCP connection table with an attribute indicating that the second device can make use at any time of said address and/or said port number to create new sub-flows associated with an ongoing TCP connection or for any other management requirement for said ongoing TCP connection.

Secondly, the invention also provides a TCP communications method comprising the following steps:

a) said first device or a proxy connected to the first device, collects information about the existence of network address translators and/or firewalls, if any, placed in series on at least one possible communications path between the first device and said second device and known to the first device or to said proxy;

b) the first device or the proxy creates an entry in at least one such network address translator and/or firewall, the entry comprising at least one IP address and/or at least one port number of the first device; and c) the first device or the proxy transmits the following to the second device:

a TCP option mentioning said at least one IP address and/or said at least one port number, and informing the second device that it can make use at any time of said IP address and/or of said port number in order to create sub-flows associated with an ongoing TCP connection or for any other management requirement for said ongoing TCP connection; or a TCP option informing the second device that it can make use any time of said at least one IP address and/or said at least one port number that have previously been communicated to the second device in order to create new sub-flows associated with an ongoing TCP connection or for any other management requirement for said ongoing TCP connection.

It should be observed that said step c) naturally assumes that a TCP connection has been initialized between said first device and said second device. The initialization may be performed either before step a) or else between said step b) and said step c).

By means of the invention, the second device is informed that it can, should that be necessary, make use without failure of said address and port number pair to set up a sub-flow on said communications path with the first device (e.g. without the first device sending data packets to the second device conveying this pair as a source address and a source port number). This thus avoids new sub-flows failing and makes it possible to transfer traffic with the second device to another interface of the first device without failure.

It should be observed that that the invention relates in particular to the situation in which there are at least two potential communications paths between the two devices, even if there is only one path that is activatable when initializing the TCP connection.

According to particular characteristics, said method further comprises the following steps:

a') said second device or a proxy connected to said second device collects information about the existence of network address translators and/or firewalls, if any, placed in series in at least one possible communications path between the first device and the second device and known to the second device or to said proxy connected to the second device;

b') the second device or the proxy connected to the second device creates an entry in at least one such network address translator and/or firewall, the entry comprising at least one IP address and/or at least one port number of the second device; and c') the second device or the proxy connected to the second device transmits to the first device said at least one IP address and/or said at least one port number in a TCP option.

By means of these provisions:

the use of multiple paths becomes symmetrical for the two parties participating in a connection: both of the terminating points of a sub-flow can add new sub-flows without risking failure; and network resources can be aggregated both at the end of the initiator of a connection and at the end of its correspondent.

The invention is preferably implemented for each of the potential communications paths between the first device and the second device, after one or the other of the devices has discovered the path.

According to other particular characteristics, said method further comprises a step during which the first device or the second device sends a TCP option to the other device informing the other device that it can make use at any time of an IP address and/or a port number previously communicated to said other device in order to create new sub-flows associated with an ongoing TCP connection or for any other management requirement for said ongoing TCP connection. In a variant, or in addition, said method further comprises a step during which the first device or the second device transmits to the other device an option informing the other device that it can make use at any time of an IP address and/or a port number mentioned in the TCP option in order to create new sub-flows associated with an ongoing TCP connection or for any other management requirement for said ongoing TCP connection.

By means of these provisions, the benefits provided by the invention can be maintained throughout the TCP connection, e.g. after the sender device that sent the TCP option has been attached to a new network, or after a new interface of the sender device has been activated.

Where appropriate, it should be observed that the device can inform its correspondent about a plurality of new IP addresses and/or a plurality of port numbers by using a single TCP option, however in order to facilitate management of the TCP connection by the correspondent, it is preferable to transmit thereto no more than one new IP address and new one port number per TCP option.

According to other particular characteristics, said method further comprises a step during which the first device or the second device transmits to the other device a TCP option specifying a lifetime associated with an IP address or a port number previously communicated to said other device.

By means of these provisions, and by way of example said correspondent is capable of anticipating certain actions that are to be performed, such as closing a sub-flow or transferring traffic to another sub-flow. For example, if the device foresees that it is going to be necessary to change its IP address for an ongoing sub-flow (e.g. because of a limited connection lifetime), it may maintain the communication with its correspondent by taking the initiative of warning it, so that the correspondent can take account in advance of this change of IP address.

According to yet other particular characteristics, said method further comprises a step during which the first device of the second device sends to the other device a message containing a TCP option to inform said other device of a preference concerning the traffic ratio to be sent to an IP address or to a port number previously communicated to said other device.

By means of these provisions, a device can specify a preference for load sharing between a plurality of available paths. This is true in particular for the device receiving data; this possibility made available to the terminals comes from a so-called "inbound traffic engineering" policy. The available network resources are thus advantageously optimized.

Correspondingly, the invention also provides various communications devices that are compatible with transmission control protocol (TCP) communications.

Thus, firstly, the invention provides a communications device possessing means for:

receiving:
- a TCP option mentioning an IP address and/or a port number; or
- a TCP option referring to an IP address and/or a port number previously communicated to said communications device; and updating a TCP connection table with an attribute indicating that the communications device can make use at any time of said address and/or said port number to create new sub-flows associated with an ongoing TCP connection or for any other management requirement for said ongoing TCP connection.

Secondly, the invention also provides a communications device possessing means for:

collecting information about the existence of network address translators and/or firewalls, if any, placed in series in at least one possible communications path between a first device and a second device and known to said communications device;

creating in at least one such network address translator and/or firewall an entry containing at least one IP address and/or at least one port number of said first device; and transmitting to said second device:
- a TCP option mentioning said at least one IP address and/or said at least one port number, and informing the second device that it can make use at any time of said IP address and/or said port number in order to create sub-flows associated with an ongoing TCP connection or for any other management requirement for said ongoing TCP connection; or
- a TCP option informing the second device that it can make use any time of said at least one IP address and/or said at least one port number that have previously been communicated to the second device in order to create new sub-flows associated with an ongoing TCP connection or for any other management requirement for said ongoing TCP connection.

In another aspect, the invention provides a client device, such as a user terminal, comprising a communications device as set out briefly above. The client device may in particular be said first device itself.

In yet another aspect, the invention provides a proxy, such as a router or a interface, comprising a communications device as set out briefly above. The proxy may in particular be connected to said first device.

The advantages made available by the communications device, the client device, and the proxy are essentially the same as those made available by the corresponding methods set out briefly above.

It should be observed that it is possible to provide such devices in the context of software instructions and/or in the context of electronic circuits.

The invention also provides a computer program downloadable from a communications network and/or stored on a computer-readable medium and/or executable by a microprocessor. The computer program is remarkable in that it comprises instructions for executing steps of any of the communications methods set out briefly above, when executed on a computer.

The advantages made available by the computer program are essentially the same as those made available by said method.

Other aspects and advantages of the invention appear on reading the following detailed description of particular implementations given as non-limiting examples.

BRIEF DESCRIPTION OF THE DRAWINGS

The description refers to the accompanying figures, in which.

DETAILED DESCRIPTION OF ILLUSTRATIVE EMBODIMENTS

The invention applies in general manner to any protocol relating to multiple-path TCP connections. The description below relates to the invention being applied to the MPTCP protocol as introduced briefly above.

Figure 6:
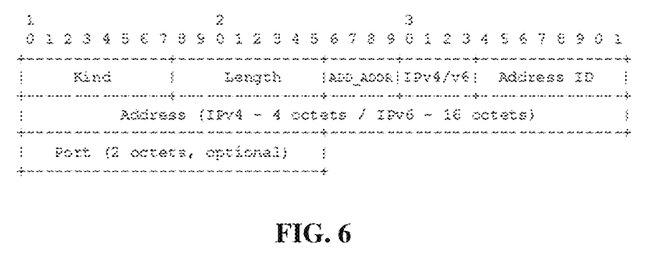
FIG. 6 shows the conventional ADD_ADDR TCP option.

In conventional manner, the MPTCP protocol has various provisions, and in particular it defines the following TCP options:

MP_CAPABLE: this option is used to inform the remote terminal that the sending terminal is compatible with MPTCP extensions;

ADD_ADDR: this option, shown in FIG. 6, is used for adding a new address; it includes an optional 2-byte field making it possible also optionally to provide a port number;

REMOVE_ADDR: this option is used for removing an address;

MP_PRIO: this option is used for modifying the priority of a connection;

MP_JOIN: this option is used for identifying the TCP connection that is associated with setting up a new sub-flow;

MP_FAIL: this option is used to return to TCP mode without MPTCP options; and

MP_FASTCLOSE: this option is used for closing an MPTCP connection quickly.

The MPTCP protocol may be activated in several modes:

native mode: two MPTCP terminals set up all of the sub-flows that correspond to the available addresses and port numbers, and make use of all of these sub-flows;

primary mode: two MPTCP terminals signal sub-flows, but only a subset of these sub-flows is actually used for transferring data;

secondary mode: in the event of the "primary" sub-flow subset being unavailable (or overloaded), a "secondary" subset of sub-flows is then requested to ensure continuity of the MPTCP connection; and fallback mode: two MPTCP terminals use a single sub-flow; in the event of failure, traffic is transferred to a new sub-flow that is created for this purpose.

The present invention proposes several new TCP options, as described below.

Figure 7:
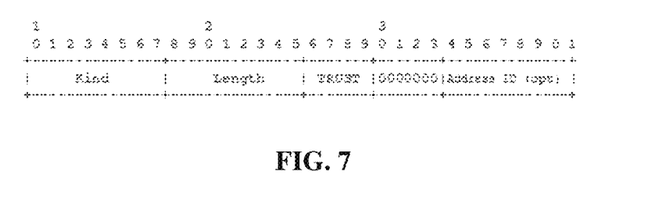
FIG. 7 shows the TRUST TCP option of the invention.

The TRUST option, shown in FIG. 7, is used by a terminal to inform its correspondent that an IP address and/or a port number used when creating the MPTCP connection can be used at any time for creating new sub-flows, or for any other management requirement for the ongoing MPTCP connection. This indication comprises explicit information according to which particular provisions are made to ensure that said IP address and/or said port number can be used at any time to create new sub-flows, or for any other management requirement for the ongoing MPTCP connection. In a variant, this TRUST option may include the address identifier, Address_ID, associated with another address, and optionally another port number, as already communicated by means of an ADD_ADDR option; under such circumstances, this TRUST option may be sent together with an ADD_ADDR option, or separately.

Figure 8:
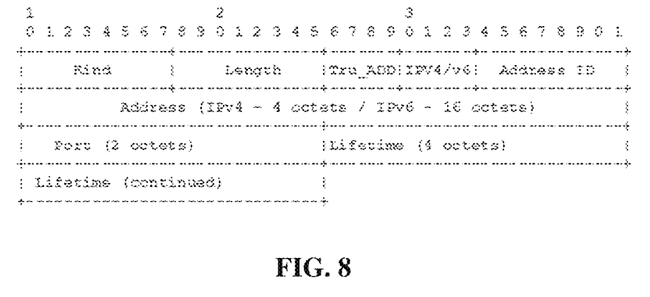
FIG. 8 shows the TRU_ADD TCP option of the invention.

The TRU_ADD option, shown in FIG. 8, is used by a terminal to inform its correspondent that the IP address and/or the port number mentioned in this option can be used at any time to create new sub-flows, or for any other management requirement for the ongoing MPTCP connection. This option also preferably contains a lifetime associated with the information contained in the option. This information may be used by a node, e.g. to close a sub-flow or to transfer traffic to a new sub-flow. This option comprises explicit information according to which particular provisions are made to ensure that a path is available, and no error is encountered if the correspondent makes use of the information contained in this option. In order to specify the value of the lifetime field, an MPTCP terminal may make use of the duration of a dynamic host configuration protocol (DHCP) lease (i.e. the maximum length of time the DHCP protocol can use an IP address allocated to the terminal), the lifetime of a port control protocol (PCP) mapping, the lifetime of a mapping between universal plug and play (UPnP) and an Internet gateway device (IGD), or any other information available thereto. The value "0" indicates that the lifetime is unlimited.

In this respect, it should be recalled that a "mapping" designates the association between an internal IP address and an internal port number with an external IP address and an external port number. With a NAT function, the internal IP address and the internal port number are input data items, while the external IP address and the external port number are allocated by the NAT function. With a firewall, the internal and external information is identical. A mapping may include other information, such as the IP address and the port number of the correspondent or an identifier of the communications protocol in use.

Figure 9:
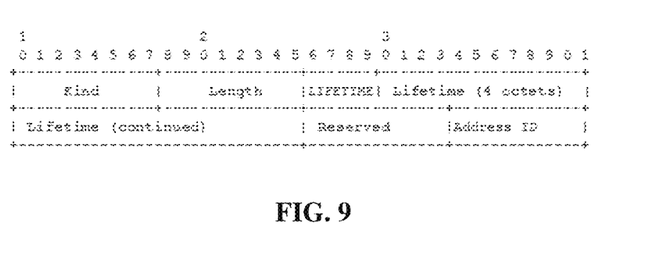
FIG. 9 shows the LIFETIME TCP option of the invention.

The LIFETIME option, shown in FIG. 9, is used for indicating a lifetime associated with information that has already been communicated by means of the ADD_ADDR or the TRU_ADD option. This option is used in particular by a terminal:

in order to notify its correspondent of any change in the lifetime of an address announced in an ADD_ADDR option; or to notify any change to information that has already been communicated in a TRU_ADD option.

In order to specify the value of the lifetime field representing said lifetime, a terminal may make use of a DHCP lease, the PCP mapping lifetime, the UPnP/IGD mapping lifetime, or any other information available thereto. The value "0" indicates a lifetime that is unlimited. This option may be sent together with an ADD_ADDR option, or separately.

Figure 10:
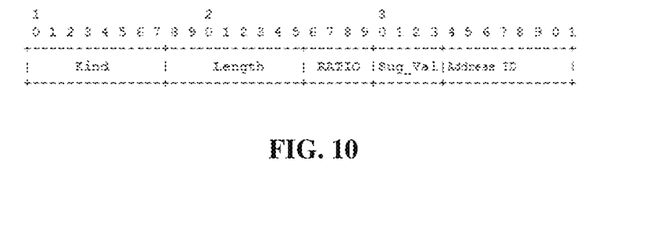
FIG. 10 shows the RATIO TCP option of the invention.

The RATIO option, shown in FIG. 10, is used by a terminal to inform its correspondent about a preferred ratio of traffic for sending to an address or a port number already communicated by means of the ADD_ADDR option or the TRU_ADD option. The correspondent need not necessarily take this preference into account. The suggested value field (Sug_Val) gives a value expressed as a percentage (e.g. the value 50 indicates a proposed ratio equal to 50%). This option may be sent together with an ADD_ADDR option or a TRU_ADD option, or separately. The MPTCP terminal can send this option at any time in order to inform its correspondent of any change of policy concerning load sharing. The absence of this option in an MPTCP exchange preferably implies that the terminal does not have any preferred ratio.

Figure 11:
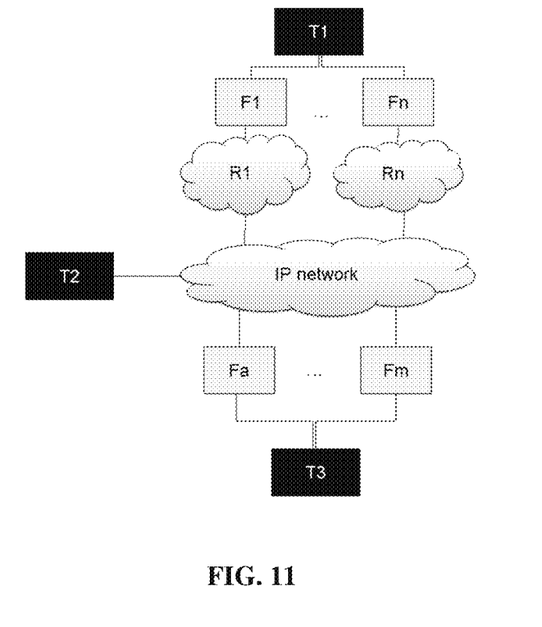
FIG. 11 shows a network configuration example having three terminals T1, T2, and T3.

FIG. 11 shows a network configuration that is used as an example in the implementations of the invention described below.

This configuration comprises a terminal T1 connected to an IP network via n functions F1, F2, . . . , Fn (such as NATs or firewalls), and n respective access networks R1, R2, . . . , Rn. This configuration also has a terminal T2 connected to an IP network via a single connection point; it is assumed that T2 is compatible with MPTCP, and that it has been allocated a single IP address. This configuration also includes a terminal T3 connected to an IP network via m functions Fa, Fb, . . . , Fm (such as NATs or firewalls).

Figure 12:
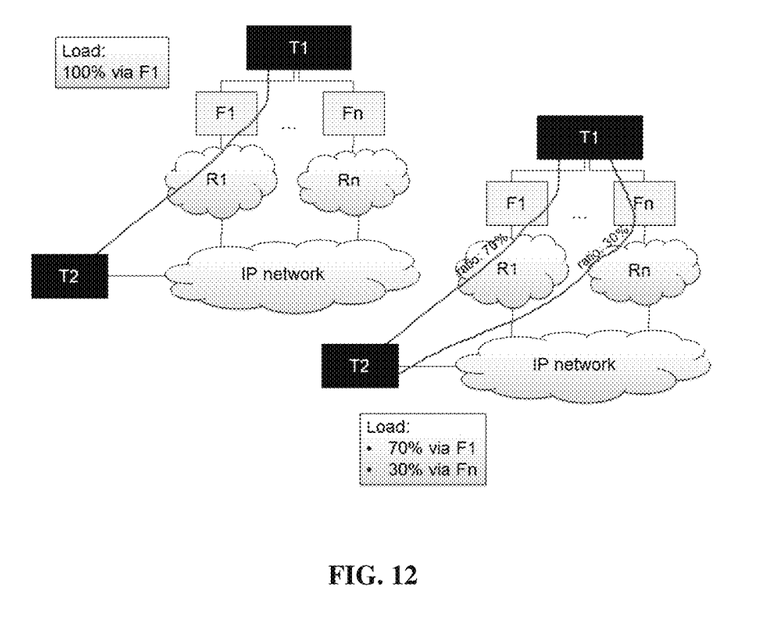
FIG. 12 shows some of the traffic between a terminal T1 and a terminal T2 being transferred from a first path to a second path.

The invention also proposes a plurality of new attributes to be included in MPTCP flow tables, as described below:

SUGGESTED_LOAD_RATIO: this field is used to store a proposed sharing of load over a plurality of paths, as communicated by a correspondent. The value of this attribute may be used by a terminal to calculate the proportion of traffic that is to be sent to the corresponding address or port number. The value of this attribute is not taken into account if local load sharing policies are in conflict with the preference expressed by the correspondent. FIG. 12 shows a terminal T1 that receives data from a terminal T2; T1 has used the RATIO option to inform T2 that it seeks to use only the path through F1 (e.g. because the F1 connection is less expensive); T1 may decide at present to tell T2 to transfer 30% of the traffic to the interface Fn; if T2 is prepared to comply with the preference specified by T1, then 70% of the traffic is maintained by T2 on the first path (i.e. via F1), while 30% is transferred (preferably gradually) to the path making use of Fn.

Figure 13:
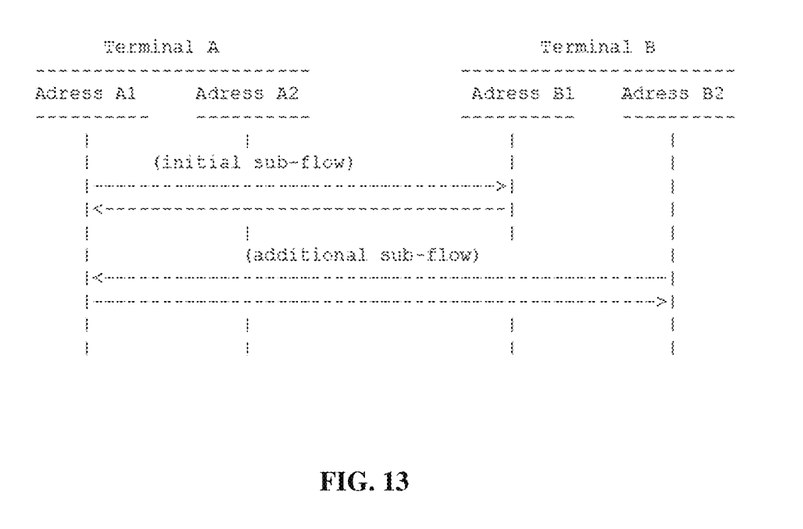
FIG. 13 shows an MPTCP connection during which a terminal creates a new sub-flow even though it did not initiate the initial MPTCP connection.
Figure 14:
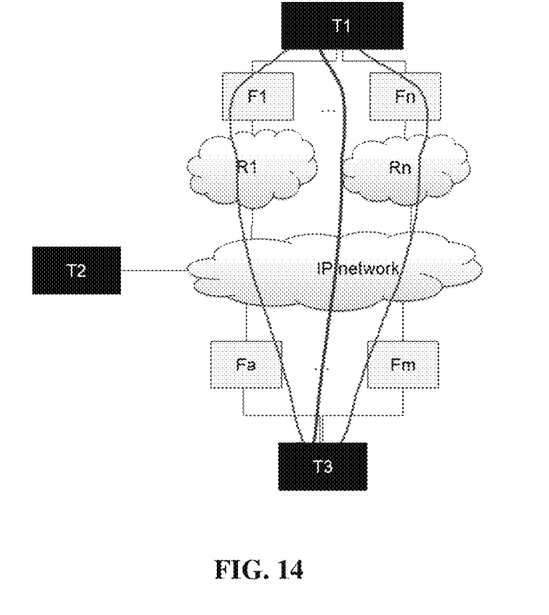
FIG. 14 shows two terminals T1 and T3 creating as many sub-flows as possible between them.

RELIABILITY: this field is set to "1" if an address or a port number had been received via the TRU_ADD option or if a TRUST option has been received for an address and/or a port number previously transmitted by means of an ADD_ADDR option. A terminal makes use of the value of this attribute (equal to "1") in order to initialize new sub-flows, even if it did not initialize the initial MPTCP connection. FIG. 13 shows an MPTCP connection during which a terminal B creates a new sub-flow, even though another terminal A initiated the initial MPTCP sub-flow. FIG. 14 shows two terminals T1 and T3 creating between them as many sub-flows as possible in order to maximize data throughput as a function of available network resources.

Figure 15:
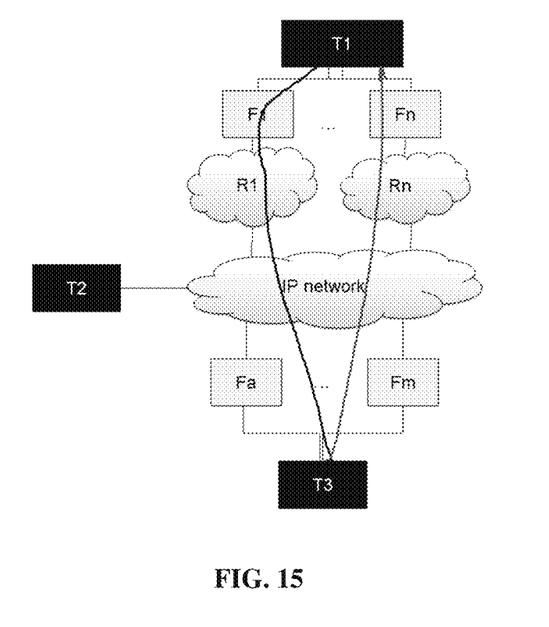
FIG. 15 shows a terminal T3 anticipating the expiry of an existing sub-flow with the terminal T1, and transferring the traffic to a new sub-flow that is created for this purpose.

EXPIRE_DATE: this field is set to the value specified in the lifetime field of a TRU_ADD option or a LIFETIME option. The value "0" is used to indicate that an IP address or a port number are of unlimited lifetime. A terminal relies on the value of this attribute, e.g. in order to initialize new sub-flows, in order to adjust its load sharing policy between the various active sub-flows, or in order to close the sub-flows making use of this IP address. FIG. 15 shows a terminal T3 anticipating expiry of an existing sub-flow and transferring the traffic to a new sub-flow that it has created for this purpose.

It should be observed that the API of the MPTCP protocol needs to be modified so as to make it possible to transmit the values of the RELIABILITY, SUGGESTED_LOAD, and EXPIRE_DATE attributes as described above to applications.

By way of example, there follows a description of four embodiments relating to the initial steps of an MPTCP connection, and in which the TCP options proposed by the present invention are used. It should be observed that the steps described in each of these implementations need not necessarily be executed in the order given.

The first embodiment is referred to as "discover-then-connect" and comprises the following steps:

1) A terminal compatible with the MPTCP protocol proceeds to discover the NAT functions or firewalls, if any, that might be in series on the communications path with potential correspondents. By way of example, this discovery step may make use of the port control protocol (PCP) for this purpose as defined in IETF specification RFC 6887.

2) The terminal discovers the list of IP addresses and port numbers that are available for setting up a set of MPTCP sub-flows with correspondents. By way of example, these addresses and port numbers may be obtained using an IP address allocation protocol such as DHCP, or a mechanism for creating a mapping, such as PCP, STUN, or UPnP. If the terminal detects the presence of a NAT function or a firewall, it proceeds to create the mapping entries needed for communicating with a correspondent.

3) The terminal uses the information that it has collected, such as an IP address, a lifetime, or an origin for an address and port number pair (e.g. DHPC, PCP, or static configuration) in order to initialize an MPTCP connection. The initiator of the MPTCP connection and its correspondent make use of the TRUST and TRU_ADD options in order to inform each other about the reliability of the addresses or port numbers announced in an ADD_ADDR or TRU_ADD option. They use the LIFETIME and TRU_ADD options to notify each other of the lifetimes of the addresses or the port numbers announced in an ADD_ADDR or a TRU_ADD option.

4) Each of the two participants to the MPTCP connection can make use of the LIFETIME option to notify the other terminal of any change of lifetime for an address or a port number that has already been announced by another TCP option (e.g. ADD_ADDR or TRU_ADD).

5) Each of the two participants to the MPTCP connection can make use of the TRU_ADD option to inform the other terminal of any new address or any new port number, together with the lifetime associated with such information.

6) Each of the two participants to the MPTCP connection can make use of the RATIO option to inform the other terminal about:
   a) a load sharing preference involving an address or a port number that has already been announced by some other TCP option (e.g. ADD_ADDR or TRU_ADD); or
   b) any change in the reliability of an IP address or a port number that has already been announced via the ADD_ADDR option or the TRU_ADD option.

The second embodiment, known as "connect-then-discover" comprises the following steps:

1) A terminal proceeds with conventional MPTCP operations (as defined in the above-mentioned RFC 6824 specification) relating to initializing an MPTCP connection.

2) Each of the two MPTCP correspondents proceeds to discover the NAT functions or firewalls, if any, that might be in series on the communication path with the other terminal, e.g. using the PCP protocol.

3) Each of the two MPTCP correspondents discovers the list of IP addresses and port number(s) available thereto for setting up a set of MPTCP sub-flows with the other terminal. These addresses may be recovered using an address allocation protocol such as DHCP, or by a mechanism for creating a mapping, such as PCP, STUN, or UPnP/IGD. If the terminal detects the presence of a NAT function or of a firewall, it proceeds to create the mapping entries needed for communicating with its correspondent.

4) Each of the two MPTCP correspondents uses the information that it has collected, such as an IP address, a lifetime, or an origin of an address and port number pair (e.g. DHCP, PCP, ICE, or static configuration) in order to construct the TRUST and TRU_ADD options for sending to inform the other terminal about the reliability of the addresses or the port numbers announced in an ADD_ADDR option or a TRU_ADD option. They make use of the LIFETIME and TRU_ADD options to inform the other terminal of the lifetimes of the addresses or port numbers announced in an ADD_ADDR option or a TRU_ADD option.

5) Each of the two MPTCP correspondents can make use of the LIFETIME option to inform the other terminal about any change of lifetime for an address or a port number that has already been announced by some other MPTCP option (e.g. ADD_ADDR or TRU_ADD).

6) Each of the two MPTCP correspondents can use the TRU_ADD option to inform the other terminal of any new address or any new port number, together with the lifetime corresponding to this information.

7) Each of the two MPTCP correspondents can use the TRUST option to inform the other terminal about any change in the reliability of an IP address or a port number that has already been announced via the ADD_ADDR option.

8) Each of the two participants to the MPTCP connection can use the RATIO option to inform the other terminal about:

a) a load sharing preference involving an address or a port number that has already been announced by some other MPTCP option (e.g. ADD_ADDR or TRU_ADD); or b) any change in the reliability of an IP address or a port number that has already been announced by the ADD_ADDR option or the TRU_ADD option.

In the two above-described embodiments, the following steps are performed:

1) An MPTCP correspondent that has already received the TRUST option updates its TCP connection table with the above-described RELIABILITY attribute in order to indicate therein that the address and/or port number in question are reliable.

2) An MPTCP correspondent that has received the LIFETIME option updates said TCP connection table by including the above-described EXPIRE_DATE attribute in order to indicate therein a new value for the expiry date of the address or the port number.

3) An MPTCP correspondent that has received the RATIO option updates its TCP connection table by including the above-described SUGGESTED_LOAD_RATIO attribute to specify a traffic sharing preference. The terminal may optionally take this preference into account.

4) An MPTCP correspondent that has received the TRU_ADD option updates its TCP connection table with the RELIABILITY attribute to indicate that the address and/or port number concerned are reliable, and optionally by including the EXPIRE_DATE attribute in order to save the new value for the expiry date of the address and/or the port number.

5) If the RELIABILITY attribute is set to "1", a terminal may act within an active MPTCP connection to decide to create new sub-flows associated with the address and/or the port number concerned.

6) A terminal monitors the value of the EXPIRE_DATE attribute in its TCP connection table in order to take decisions such as anticipating closure of a sub-flow, transferring traffic to at least one other active sub-flow, or creating at least one other new sub-flow. It is recommended to anticipate traffic transfer so as to leave enough time before the expected expiry for performing traffic transfer operations.

In a third embodiment, a proxy is used (i.e. a relay device).

Figure 16:
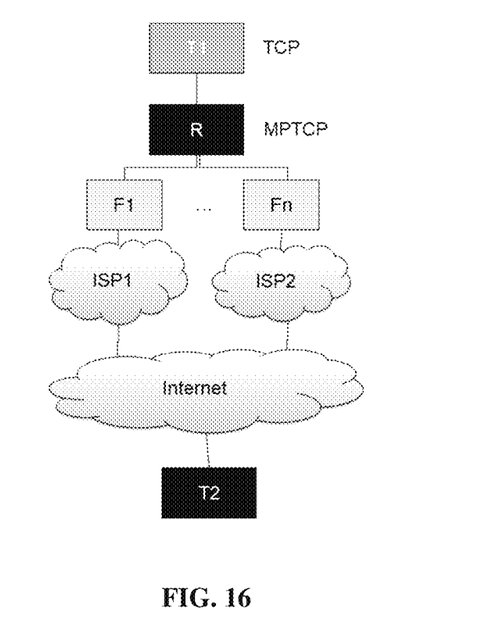
FIG. 16 shows an implementation in which a proxy connects at least one terminal T1 that is not MPTCP-compatible to a plurality of networks.

In this third embodiment, shown in FIG. 16, a proxy R (e.g. a router or a gateway) connects at least one terminal T1 that is not MPTCP-compatible to a plurality of networks. The proxy R is itself MPTCP-compatible; furthermore, in a manner analogous to the steps described with reference to the above-described first and second implementations, it is suitable for inserting at least one TCP option of the invention in a message sent to the terminal T2, or for taking into consideration at least one TCP option of the invention received in a message coming from the terminal T2, so as to enable the terminal T1 to communicate with the terminal T2 while benefiting from the advantages that are provided by the present invention, and to do so in spite of the fact that the terminal T1 is not compatible with the MPTCP protocol.

In a fourth embodiment, use is likewise made of an MPTCP-compatible proxy.

Figure 17:
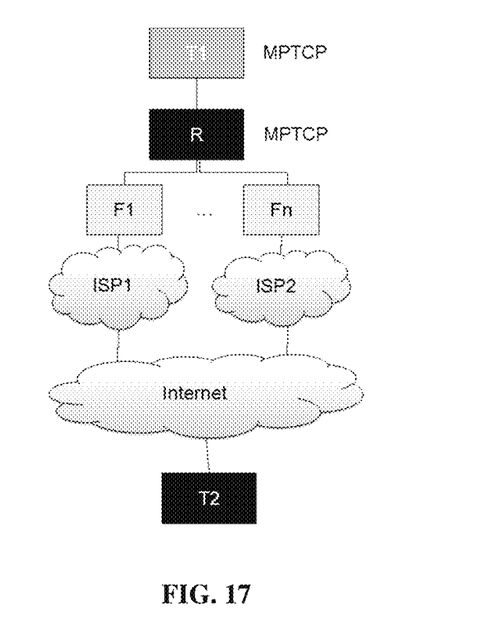
FIG. 17 shows an implementation in which a proxy connects at least one MPTCP-compatible terminal T1 to a plurality of networks.

In this fourth embodiment, shown in FIG. 17, a proxy R (e.g. a router or a gateway) connects at least one terminal T1 to a plurality of networks. The terminal T1 has a single interface, but it is nevertheless MPTCP-compatible; in particular, it is suitable for informing a correspondent T2 of its MPTCP capability. The proxy R has knowledge of multiple paths enabling T1 to communicate with T2. In a manner analogous to the steps described with reference to the above-described first or second implementations, the proxy R is suitable for inserting or for modifying at least one TCP option contained in a message sent by the terminal T1 to the terminal T2 or received from the terminal T2 for the terminal T1 so as to enable the terminal T1 to communicate with the terminal T2 while benefiting from the advantages provided by the present invention, and to do so in spite of the fact that the terminal T1 is not a MIF terminal.

The invention may be implemented within nodes of communications networks, e.g. terminals, routers, or gateways, by using software and/or hardware components.

The software components may be incorporated in a conventional computer program for managing a network node. That is why, as mentioned above, the present invention also provides a computer system. The computer system comprises in conventional manner a central processor unit using signals to control a memory, together with an input unit or an output unit. The computer system may also be used for executing a computer program including instructions for performing any of the communications methods of the invention.

Specifically, the invention also provides a computer program that is downloadable from a communications network that includes instructions for executing steps of a communications method of the invention when executed on a computer. The computer program may be stored on a computer-readable medium and may be executed by a microprocessor.

The program may use any programming language and may be in the form of source code, object code, or code intermediate between code source and object code, such as in a partially compiled form, or in any other desirable form.

The invention also provides a non-removable, or a partially or totally removable data medium that is computer readable and that includes instructions of a computer program as mentioned above.

The data medium may be any entity or device capable of storing the program. By way of example, the medium may comprise storage means such as a read only memory (ROM), e.g. a compact disk (CD) ROM or a microelectronic circuit ROM, or magnetic recording means, such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any of the communications methods of the invention.

Although the present disclosure has been described with reference to one or more examples, workers skilled in the art will recognize that changes may be made in form and detail without departing from the scope of the disclosure and/or the appended claims.

The invention claimed is:

1. A transmission control protocol communications method between a first device and a second device, the method comprising the following acts:
  a) said first device or a proxy connected to the first device, collects information about existence of network address translators and/or firewalls, if any, placed in series on at least one possible communications path between the first device and said second device and known to the first device or to said proxy;
  b) the first device or the proxy creates an entry in at least one such network address translator and/or firewall, the entry comprising at least one IP address and/or at least one port number of the first device; and
  c) once the entry is created in said at least one network address translator and/or firewall making said at least one IP address and/or at least one port number reliable to create a sub-flow associated with an ongoing TCP connection, the first device or the proxy transmits the following to the second device:
    a TCP option mentioning said at least one IP address and/or said at least one port number of the first device and used by the first device or by the proxy to explicitly notify said second device of reliability of said at least one IP address and/or said at least one port number, said TCP option informing the second device that particular provisions were made to ensure that a path is available, and that no error will be encountered if the second device makes use at any time of said at least one IP address and/or said at least one port number in order to create sub-flows associated with said ongoing TCP connection or for any other management requirement for said ongoing TCP connection; or
    a TCP option informing the second device that particular provisions were made to ensure that no error will be encountered if the second device makes use at any time of said at least one IP address and/or said at least one port number of the first device in order to create new sub-flows associated with said ongoing TCP connection or for any other management requirement for said ongoing TCP connection, wherein said at least one IP address and/or said at least one port number of the first device have previously been communicated to the second device, said TCP option being used by the first device or by the proxy to explicitly notify said second device of reliability of said at least one IP address and/or said at least one port number.

2. The communications method according to claim 1, wherein said first device initializes a TCP connection with said second device before said act a).

3. The communications method according to claim 1, wherein said first device initializes a TCP connection with said second device between said act b) and said act c).

4. The communications method according to claim 1, wherein the method further comprises the following acts:
  a') said second device or a proxy connected to said second device collects information about the existence of network address translators and/or firewalls, if any, placed in series in at least one possible communications path between the first device and the second device and known to the second device or to said proxy connected to the second device;
  b') the second device or the proxy connected to the second device creates an entry in at least one such network address translator and/or firewall, the entry comprising at least one IP address and/or at least one port number of the second device; and
  c') the second device or the proxy connected to the second device transmits to the first device said at least one IP address and/or said at least one port number in a TCP option.

5. The communications method according to claim 1, wherein the method further comprises an act during which the first device or the second device sends a TCP option to the other device informing the other device that particular provisions were made to ensure that no error will be encountered if the other device makes use at any time of an IP address and/or a port number that have previously been communicated to said other device in order to create new sub-flows associated with an ongoing TCP connection or for any other management requirement for said ongoing TCP connection.

6. The communications method according to claim 1, wherein the method further comprises an act during which the first device or the second device transmits to the other device a TCP option informing the other device that particular provisions were made to ensure that a path is available, and that no error will be encountered if the other device makes use at any time of an IP address and/or a port number mentioned in the TCP option in order to create new sub-flows associated with an ongoing TCP connection or for any other management requirement for said ongoing TCP connection.

7. The communications method according to claim 6, wherein the TCP option further comprises a lifetime associated with the information contained in said TCP option.

8. The communications method according to claim 1, wherein the method further comprises an act during which the first device or the second device transmits to the other device a TCP option specifying a lifetime associated with an IP address or a port number previously communicated to said other device.

9. A transmission control protocol communications method between a first device and a second device, the method comprising the following acts:
  after an entry is created in at least one network address translator and/or firewall, placed in series on at least one possible communications path between the first device and said second device and known to the first device or to a proxy connected to the first device, wherein the entry has been created by said first device or said proxy, the entry comprising at least one IP address and/or at least one port number of the first device making said at least one IP address and/or at least one port number reliable to create a sub-flow associated with an ongoing TCP connection, said second device receives from said first device or from said proxy connected to the first device:
    a TCP option mentioning said at least one IP address and/or said at least one port number of the first device, and used by the first device or by the proxy to explicitly notify said second device of reliability of said at least one IP address and/or said at least one port number, said TCP option informing the second device that particular provisions were made to ensure that a path is available, and that no error will be encountered if the second device makes use at any time of said at least one IP address and/or said at least one port number in order to create sub-flows associated with said ongoing TCP connection or for any other management requirement for said ongoing TCP connection; or a TCP option referring to said at least one IP address and/or said at least one port number of the first device, wherein said at least one IP address and/or said at least one port number of the first device have previously been communicated to the second device, said TCP option being used by the first device or by the proxy to explicitly notify said second device of reliability of said at least one IP address and/or said at least one port number, said TCP option informing the second device that particular provisions were made to ensure that no error will be encountered if the second device makes use at any time of said at least one IP address and/or said at least one port number that have previously been communicated to the second device in order to create new sub-flows associated with said ongoing TCP connection or for any other management requirement for said ongoing TCP connection; and the second device updates a TCP connection table with an attribute indicating that the second device can make use at any time of said at least one IP address and/or said at least one port number to create new sub-flows associated with the ongoing TCP connection or for any other management requirement for said ongoing TCP connection.

10. A communications device compatible with transmission control protocol communications, the communications device comprising:

a non-transitory computer-readable memory comprising program code instructions stored thereon;

a processor configured by the instructions to perform acts comprising:

collecting information about existence of network address translators and/or firewalls, if any, placed in series in at least one possible communications path between a first device and a second device and known to said communications device;

creating in at least one such network address translator and/or firewall an entry containing at least one IP address and/or at least one port number of said first device; and once the entry is created in said at least one network address translator and/or firewall making said at least one IP address and/or said at least one port number reliable to create a sub-flow associated with an ongoing TCP connection, transmitting to said second device:

a TCP option mentioning said at least one IP address and/or said at least one port number of the first device and used by the communications device to explicitly notify said second device of reliability of said IP address and/or port number, said TCP option informing the second device that particular provisions were made to ensure that a path is available, and that no error will be encountered if the second device makes use at any time of said at least one IP address and/or said at least one port number in order to create sub-flows associated with said ongoing TCP connection or for any other management requirement for said ongoing TCP connection; or a TCP option informing the second device that particular provisions were made to ensure that no error will be encountered if the second device makes use at any time of said at least one IP address and/or said at least one port number of the first device in order to create new sub-flows associated with said ongoing TCP connection or for any other management requirement for said ongoing TCP connection, wherein said at least one IP address and/or said at least one port number of the first device have previously been communicated to the second device, said TCP option being used by the communications device to explicitly notify said second device of reliability of said at least one IP address and/or at least one port number.

11. A communications device compatible with transmission control protocol communications, the communications device comprising:

a non-transitory computer-readable memory comprising program code instructions stored thereon;

a processor configured by the instructions to perform acts comprising:

after an entry is created in at least one network address translator and/or firewall, placed in series on at least one possible communications path between another device and said communications device and known to the other device or to a proxy connected to the other device, wherein the entry has been created by said other device or said proxy, the entry comprising at least one IP address and/or at least one port number of the other device making said at least one IP address and/or port number reliable to create a sub-flow associated with an ongoing TCP connection, receiving from said other device or from the proxy connected to the other device:

a TCP option mentioning said at least one IP address and/or said at least one port number of the other device, used by the other device to explicitly notify said communications device of reliability of said at least one IP address and/or said at least one port number, said TCP option informing the communications device that particular provisions were made to ensure that a path is available, and that no error will be encountered if the communications device makes use at any time of said at least one IP address and/or said at least one port number in order to create sub-flows associated with the ongoing TCP connection or for any other management requirement for said ongoing TCP connection; or a TCP option referring to said at least one IP address and/or said at least one port number of the other device, wherein said at least one IP address and/or said at least one port number of the other device have been previously communicated to said communications device, said TCP option being used by the other device to explicitly notify said communications device of reliability of said at least one IP address and/or said at least one port number, said TCP option informing the communications device that particular provisions were made to ensure that no error will be encountered if the communications device makes use at any time of said at least one IP address and/or said at least one port number that have previously been communicated to the device in order to create new sub-flows associated with the ongoing TCP connection or for any other management requirement for said ongoing TCP connection; and updating a TCP connection table with an attribute indicating that the communications device can make use at any time of said at least one address and/or said at least one port number to create new sub-flows associated with the ongoing TCP connection or for any other management requirement for said ongoing TCP connection.

12. The communications device according to claim 10, wherein the communications device is a client device.

13. The communications device according to claim 10, wherein the communications device is a proxy device.

14. A non-transitory, non-removable, or partially or completely removable data storage medium including computer program code instructions stored thereon for executing acts of a transmission control protocol communications method between a first device and a second device, when executed by a processor, wherein the program code instructions configure the processor to perform acts comprising:
  a) said first device or a proxy connected to the first device, collects information about existence of network address translators and/or firewalls, if any, placed in series on at least one possible communications path between the first device and said second device and known to the first device or to said proxy;
  b) the first device or the proxy creates an entry in at least one such network address translator and/or firewall, the entry comprising at least one IP address and/or at least one port number of the first device; and
  c) once the entry is created in said at least one network address translator and/or firewall making said at least one IP address and/or said at least one port number reliable to create a sub-flow associated with an ongoing TCP connection, the first device or the proxy transmits the following to the second device:
    a TCP option mentioning said at least one IP address and/or said at least one port number of the first device and used by the first device or by the proxy to explicitly notify said second device of reliability of said at least one IP address and/or said at least one port number, said TCP option informing the second device that particular provisions were made to ensure that a path is available, and that no error will be encountered if the second device makes use at any time of said at least one IP address and/or said at least one port number in order to create sub-flows associated with the ongoing TCP connection or for any other management requirement for said ongoing TCP connection; or
    a TCP option informing the second device that particular provisions were made to ensure that no error will be encountered if the second device makes use at any time of said at least one IP address and/or said at least one port number of the first device in order to create new sub-flows associated with said ongoing TCP connection or for any other management requirement for said ongoing TCP connection, wherein said at least one IP address and/or said at least one port number of the first device have previously been communicated to the second device, said TCP option being used by the first device or by the proxy to explicitly notify said second device of reliability of said at least one IP address and/or said at least one port number.

15. The communications device according to claim 11, wherein the communications device is a client device.

16. The communications device according to claim 11, wherein the communications device is a proxy device.

* * * * *